Oct. 27, 1959     C. E. CLARKE ET AL     2,910,202

WHEEL ROTATING APPARATUS FOR TIRE WASHING MACHINE

Filed June 26, 1957

INVENTOR.
CHARLES E. CLARKE
JOHN P. SILK
BY KENWAY, JENNEY, WITTER & HILDRETH

ATTORNEYS

United States Patent Office 2,910,202
Patented Oct. 27, 1959

2,910,202

WHEEL ROTATING APPARATUS FOR TIRE WASHING MACHINE

Charles E. Clarke, Winchester, and John P. Silk, Lexington, Mass.; said Clarke assignor to said Silk Application June 26, 1957, Serial No. 668,235

2 Claims. (Cl. 214—340)

The tire washing machines which are now in use embody several objectionable features, particularly those types having two sets of rollers driven in the same direction and over which the automobile travels as jets of steam and/or hot water are directed against the exposed side walls of the tires. If the automobile has inadvertently been left in gear the rollers, acting through the tires, differential and transmission, drive the engine and thus put an unnecessary and sometimes a harmful strain on these parts; and even when the automobile has been left out-of-gear, the rollers act on the differential, drive shaft and at least a part of the transmission.

The drive for such rollers usually comprise chains and sprockets in an exposed location where they are harmfully affected by water. The slippage of the chains on the sprockets and sometimes breaking the chains results when the rollers encounter resistance. Moreover, the chains and sprockets usually get showered by the hot water and dirt incident to the washing, and consequent lubrication is washed off and dirt substituted, which not only causes excessive wear, but materially adds to the maintenance cost.

The invention has as an object the provision of novel and effective wheel rotating means by which the wheels of a vehicle may rapidly and safely be rotated while the wheels and tires are being washed.

Further objects relate to various features of construction and will be apparent from a consideration of the following description and the accompanying drawings, wherein.

In accordance with the present invention we provide a tire washing machine which comprises two parallel rows of aligned rollers over which the wheels of an automobile are towed, and these rollers are supported on axes which extend at right angles to the rows. Certain of the rollers in each row, e.g., all but the first and last rollers, are driven in one direction and the corresponding rollers in the other row are simultaneously driven at the same speed in the opposite direction, the advantage being that due to the differential of the automobile the driving force required is a minimum, but furthermore substantially no strain is put on the rear end, transmission and associated mechanisms. A further advantage is that while the automobile is being towed or pulled through the washing line at an average speed of about 2-3 miles per hour, the wheels can be rotated so that their peripheral speed approximates 30 to 40 miles per hour, an accomplishment which could not safely be achieved if both sets of rollers were being driven in the same direction.

Although various types of drives may be employed, the preferred form consists of an elongate enclosed housing between the two rows of rollers into which the roller-driving shafts project, and extending lengthwise within this housing between the inner ends of the roller-driving shafts is a main driving shaft carrying spaced beveled gears meshing with gears carried by the ends of the roller-driving shafts. This arrangement is particularly advantageous in that the driving and transmission mechanisms are tightly sealed so that no dirt, water or extraneous matter can interfere with their operation and such a housing may be filled with lubricating oil so as to assure continuous lubrication of the rotating parts, thus guaranteeing a smooth and efficient operation.

The cleaning operation is performed by the combined action of a plurality of scouring brushes contacting the rotating tires, and nozzles arranged to discharge a jet of cleaning fluid such as steam and/or hot water against the surfaces on which the brushes act. To this end the brushes are preferably mounted on pivotal arms carried by supports which are movable to and from tire-scouring position, and the nozzles with associated valves are likewise mounted on such supports adjacent to the brushes so that the brushes when brought into contact with the tires, the supporting arms are rocked or depressed so as to open the nozzle valves. This arrangement is highly efficient since no cleaning fluid is used until the brushes actually contact the tires and the moment the brushes and tires are disengaged the valves automatically shut off.

Figure 1:
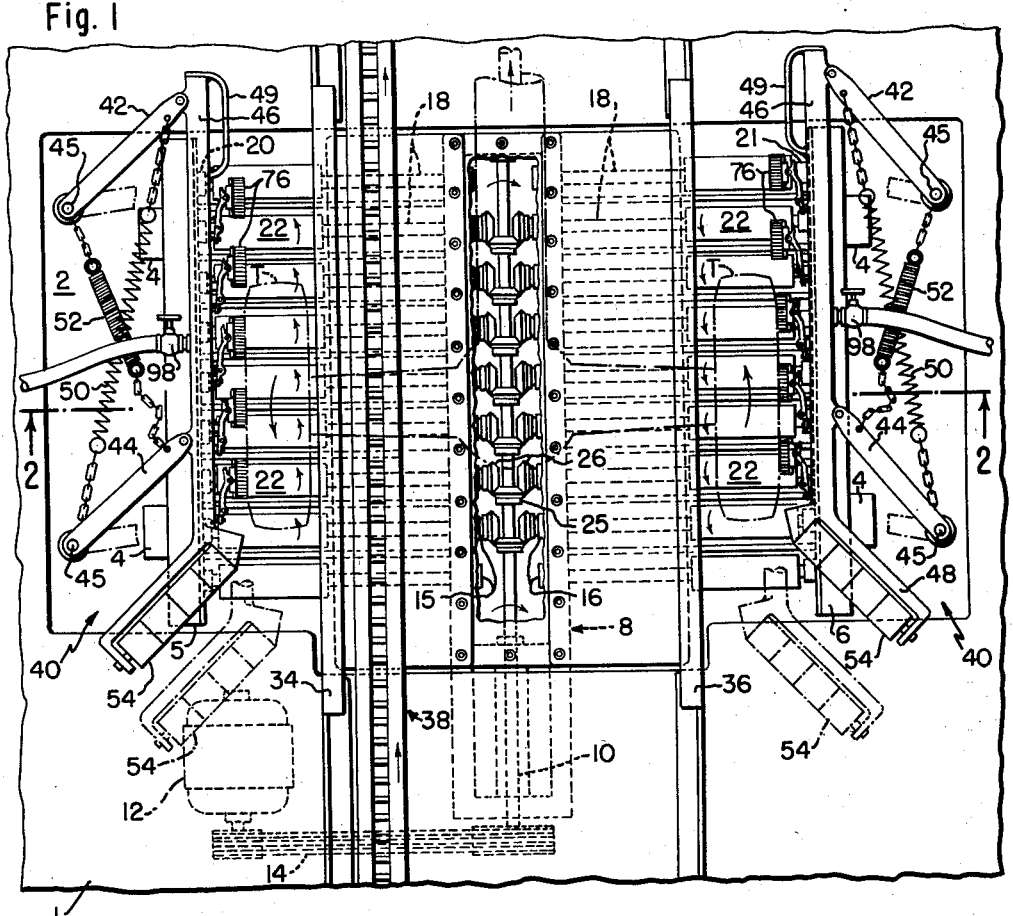
Fig. 1 is a plan view of a tire washing machine constructed in accordance with the present invention.
Figure 2:
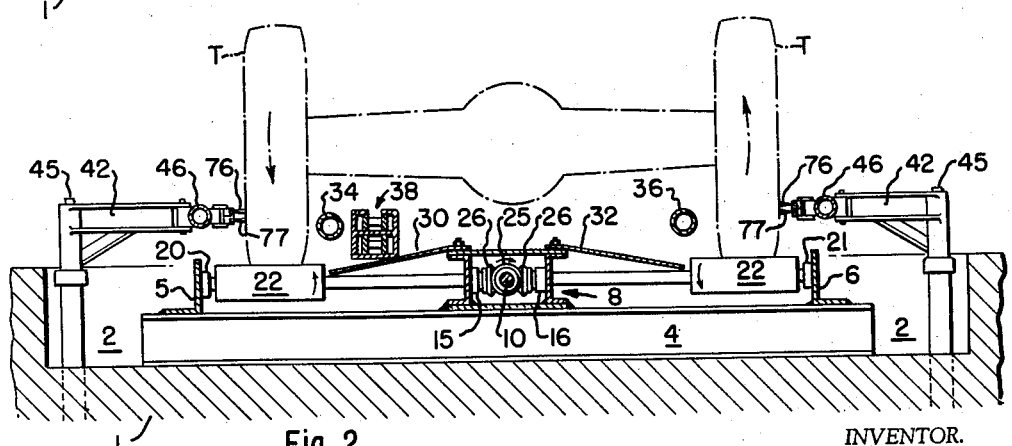
Fig. 2 is a section on the line 2—2 of Fig. 1.

Referring to Figs. 1 and 2, the embodiment shown therein comprises a concrete base 1 having a shallow trough 2 which supports a pair of transversely extending I-beams 4. Mounted on the beams 4 are longitudinally extending angle irons 5 and 6 spaced apart a distance somewhat greater than the wheels of an automobile. Between these angle irons is a longitudinally extending, enclosed housing 8 and within this housing is a main drive shaft 10 supported at spaced points by suitable bearings. The forward end of the shaft 10 projects outwardly through the end wall of the housing and carries a three-groove sheave connected to a driving motor 12 by the belts 14.

The side walls of the housing are provided with spaced openings aligned with each other and with bearings 15 and 16 which are secured to the inner faces of the side walls. The inner ends of a plurality of roller-driving shafts 18 project through these openings and are rotatably supported by the bearings 15 and 16, their inner ends terminating in spaced relation to the main drive shaft 10. The outer ends of these shafts are rotatably supported by bearings 20 and 21 secured to the inner faces of the vertical wings of the angle irons 5 and 6, it being understood that the axes of the shafts are in the same horizontal plane. Fixed to each of the shafts 18 is a roller 22 having a length approximately twice the thickness or depth of a tire T to be washed so as to provide an adequate support in event the automobile wheels are not centered on the rollers.

As here shown by way of illustration, there are nine rollers in each row and in order to insure ease in moving the automobile to and from the machine, the first and last roller of each row is freely rotatable, but all other rollers are driven simultaneously at the same speed, those in one row being driven in one direction and those in the other row being driven in the opposite direction, as indicated by the small arrows. To this end the main drive shaft 10 carries spaced bevel gears 25 which mesh with gears 26 carried by the inner ends of the shafts 18. Hence, clockwise rotation of the shaft 10 causes the rollers 22 in the right hand row to rotate in one direction (counterclockwise as viewed from the right hand side of Fig. 2) and the rollers in the left hand row to rotate clockwise.

The housing is provided with a cover plate 28 carrying a gasket to insure a leakproof enclosure which receives lubricating oil through a fill plug (not shown). Bolted to the housing 8 are shields 30 and 32 which extend adjacent to the inner end of the rollers 22 so as to protect the shafts 18, and above the outer edges of the shields are tubular guard rails 34 and 36 which prevent the automobile wheels from turning inwardly over the shields when the automobile is being towed along the path of travel by a conveyor mechanism designated by the numeral 38.

Outwardly of each row of rollers is the scouring device 40 which comprises a pair of arms 42 and 44 pivotally mounted on vertical shafts 45 secured to the base 1. The inner end of these arms are pivotally connected with a tubular link which provides a manifold 46. The front end of the manifold is provided with an angular extension 48, and secured to the rear end portions of the manifolds 46 are contact rails 49 which hold the manifolds outwardly until the rear wheels of an automobile clear the end of the machine. The arms 42 and 44, the base 1 and manifold 46 provide, in effect, a four-bar or parallel linkage system wherein the manifold 46 is at all times parallel to the two rows of rollers.

The manifolds 46 are normally maintained in position over the rollers 22, as indicated by the dot and dash lines of Fig. 1, by tension springs 50, the ends of which are connected to the arms 42 and shafts 45 supporting the arms 44. In order to provide resilient stops which cushion the shock of being swung inwardly by the spring 50, tension springs 52 are provided, one end of the springs being connected to the arms 44 and the other ends are connected to the shaft 45 supporting the arms 42.

The ends of the extensions 48 are provided with inwardly directed brackets which pivotally support rollers 54 which provide the tire contacts preventing the wheels from riding up over the extension 48. Hence, when the parts are positioned as indicated by the dot and dash lines of Fig. 1, the front tires of an automobile being towed through the washing machine first contact the rollers 54 causing the manifolds 46 to move outwardly against the action of the springs 50 which urge them to tire-scouring position, as shown by the full lines of Fig. 1, and when the front wheels clear the last driven rolls, the contact rails 49 engage the tires to hold the parts in position until the rear wheels engage the rollers 54. When the rear wheels clear the rails 49 the manifold 46 and associated parts are returned to normal position by the springs 50, the springs 52 providing resilient stops cushioning the shock which would otherwise take place.

In the scouring mechanism indicated generally in Figs. 1 and 2 the manifolds 46 are provided with a series of nozzles (not shown). Associated with the nozzles and carried by the manifold 46 are pivotally mounted brushes 76, arranged to contact the walls of the tires during passage of the vehicle along the machine. The manifolds 46 are connected through valves 98 and flexible hoses to a source of fluid under pressure, such as to a steam boiler, not illustrated. Preferably the brushes are associated with individual shut-off valves for the adjacent nozzles so that when and only when a brush is in scouring engagement with a tire is the adjacent nozzle open to discharge cleaning fluid against the tire. Such feature forms no part of the claimed invention and is therefore not illustrated in detail.

A summary of the operation of the machine is as follows: Assuming that the valves 98 are open and there is adequate steam pressure in the manifolds 46, that the motor 12 and conveyor 38 are in operation, and that the parts are as indicated by the dot and dash lines of Fig. 1, an automobile approaches the front end of the washing machine and the operator attaches a tow chain or rope to its front bumper and the conveyor chain which pulls the automobile onto the machine at a relatively low speed, for example, approximately two miles per hour. The front wheels first strike the rollers 54, thereby moving the manifolds 46 and associated parts outwardly and after the automobile has been towed over the first idler roller it then contacts the second roller in each row. In the meantime the manifolds 46 and associated parts have moved inwardly under the action of the spring 50, as shown by the full lines of Figs. 1 and 2, so as to bring the brushes 76 in contact with the side walls of the tires T. The contact of the tires with the rotating rollers 22 establishes a driving engagement which rotates one wheel in one direction and the other wheel in the opposite direction at a peripheral speed of 30 to 40 miles per hour, as indicated by the arrows in Figs. 1 and 2, and simultaneously the engagement of the brushes with the side walls of the tires opens the valves associated with said brushes so that a jet of cleaning fluid, such as wet steam, is directed against that part of the tire wall on which the brushes are acting. As the automobile is towed from one pair of driven rollers to the next, the tires disengage one set of brushes, thereby closing the associated valves, but as they contact the next pair of driven rollers, another set of brushes come into operation as above described. This action is repeated until the tires disengage the last pair of driven rollers and after passing beyond the last idler roll and disengaging the rail 49, the manifolds 46 and associated parts swing inwardly preparatory to the approach of the next automobile.

The simultaneous relatively high speed rotation of the wheels and the combined action of the brushes and high velocity jets on the side walls of the tires are such as to remove all dirt therefrom by the time the automobile disengages the last set of driven rollers. Moreover, it will be observed that no steam or cleaning fluid is being used unless the brushes are in actual operation.

While we have shown and described one desirable embodiment of the invention it is to be understood that this disclosure is for the purpose of illustration and that various changes and modifications may be made without departing from the spirit and scope of the invention as set forth in the appended claims.

We claim:
1. In apparatus for washing a wheeled vehicle wherein the vehicle is advanced by means external to the vehicle along spaced track surfaces aligned with the vehicle wheels, tire washing means comprising a row of closely-spaced parallel rollers in each track surface, said rollers having their axes transverse to the direction of vehicle advance and having their top surfaces approximately in the plane of the track surface to engage and support the vehicle wheel as the vehicle is advanced along the track, each row of rollers having at least four rollers, at least the first and the last roller in each track being idler rollers, and means for driving the rollers intermediate the idler rollers in one direction in one track and in the opposite direction in the other track at substantially the corresponding speed.

2. Apparatus according to claim 1 wherein the driving means rotates the rollers at a speed corresponding to a wheel rotation substantially in excess of that corresponding to the rate of vehicle advance along the track.

References Cited in the file of this patent
UNITED STATES PATENTS

| | | |
|---|---|---|
| 1,412,732 | Young | Apr. 11, 1922 |
| 1,942,653 | Kiggins | Jan. 9, 1934 |
| 2,490,921 | Rousseau | Dec. 13, 1949 |
| 2,705,810 | McDermott | Apr. 12, 1955 |
| 2,797,006 | Thompson | June 25, 1957 |
| 2,822,564 | Crivelli | Feb. 11, 1958 |